United States Patent [19]

Hasegawa et al.

[11] Patent Number: 4,590,253
[45] Date of Patent: May 20, 1986

[54] ORGANOSILICON POLYMER AND PROCESS FOR PRODUCTION THEREOF

[75] Inventors: Yoshio Hasegawa, Oharai; Takeo Kobori, Taiyo; Kazushige Fukuda, Kitakyushu, all of Japan

[73] Assignees: Kurosaki Refractoris Co., Ltd., Fukuoka; The Foundation: The Research Institute for Special Inorganic Materials, Ibaraki, both of Japan

[21] Appl. No.: 693,311
[22] Filed: Jan. 18, 1985

Related U.S. Application Data

[63] Continuation of Ser. No. 296,281, Aug. 26, 1981, abandoned.

[51] Int. Cl.⁴ .............................................. C08G 77/60
[52] U.S. Cl. ........................... 528/14; 525/474; 525/475; 528/15; 528/16; 528/17; 528/18; 528/19; 528/33; 556/430; 556/431; 556/435
[58] Field of Search ........................ 528/14–19, 528/33, 35; 525/474, 475; 556/430, 431, 435

[56] References Cited

U.S. PATENT DOCUMENTS

| | | | |
|---|---|---|---|
| 3,422,039 | 1/1969 | Nametkin et al. | 528/14 |
| 4,052,430 | 10/1977 | Yajima et al. | 556/434 |
| 4,159,259 | 6/1979 | Yajima et al. | 528/14 |
| 4,220,600 | 9/1980 | Yajima et al. | 556/434 |
| 4,310,482 | 1/1982 | Baney | 528/35 |
| 4,310,651 | 1/1982 | Baney et al. | 528/33 |
| 4,377,677 | 3/1983 | Iwai et al. | 528/33 |

FOREIGN PATENT DOCUMENTS 2708635  9/1977  Fed. Rep. of Germany ........ 528/35

OTHER PUBLICATIONS

Fritz, *Angew Chemistry*, vol. 79, pp. 657–663 (1967).

Primary Examiner—Wilbert J. Briggs, Sr.
Attorney, Agent, or Firm—Ladas & Parry

[57] ABSTRACT

An organosilicon polymer whose main-chain skeleton is composed mainly of the following structural units (A), (B), (C), (D), (E) and (F)

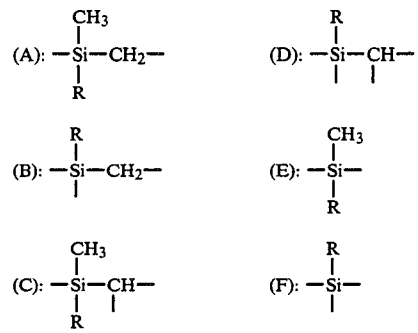

wherein R represents $CH_3$ or H, said structural units forming linear, branched and cyclic structures, and said main-chain skeleton further having a polysilane skeleton

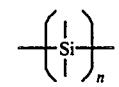

$(2 \leq n \leq 10)$. The said organosilicon polymer can be produced by adding at least one anhydrous metal halide to a polysilane having the structure

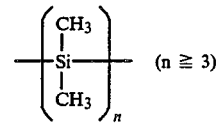

$(n \geq 3)$ the amount of the metal halide being 0.5 to 10% by weight based on the weight of the polysilane; and heating the mixture in an atmosphere inert to the reaction.

5 Claims, 3 Drawing Figures

ORGANOSILICON POLYMER AND PROCESS FOR PRODUCTION THEREOF

This is a continuation of co-pending application Ser. No. 296,281 filed on Aug. 26, 1981, now abandoned.

BACKGROUND OF THE INVENTION

This invention relates to a novel organosilicon polymer composed mainly of a carbosilane skeleton and a polysilane skeleton, and to a process for production thereof.

Polymers having a skeleton composed of alternately bonded silicon and carbon atoms with a side-chain organic group bonded to a silicon atom are called polycarbosilanes. Since these polymers are converted to inorganic materials containing silicon carbide as a main component when fired in a non-oxidizing atmosphere, they are suitable as a material for silicon carbide, and are utilized in the form of silicon carbide fibers, sintering aids, impregnating agents, fine silicon carbide powders, etc.

Polycarbosilanes known heretofore include, for example, that disclosed in Fritz: Angew. Chem., 79, page 657 (1967) which is synthesized by thermally decomposing and condensing a monosilane at a temperature of as high as 600° to 800° C. in a flow-type reactor, and that disclosed in U.S. Pat. No. 4,052,430 to Yajima et al. A polycarbosilane partly containing a siloxane bond can be synthesized by the method described in U.S. Pat. No. 4,220,600 to Yajima et al. which comprises adding polyborosiloxane having a phenyl group at least partly in a side chain of Si as a reaction promoter to an organopolysilane, and thermally decomposing and condensing it at 250° C. to 500° C. under atmospheric pressure. These synthesizing methods, however, are industrially disadvantageous because they require high temperatures and a flow-type device adapted for recycling, or require high pressures in a pressurized vessel. Furthermore, when a special reaction promoter such as polyborosiloxane is used, the resulting polymer contains a siloxane bond and therefore, is not suitable when it is desired to minimize oxygen in the fired product.

Since these conventional polycarbosilanes can be converted to silicon carbide by firing in an atmosphere of a non-oxidizing atmosphere, they are very useful as a material for thermally stable inorganic materials. Furthermore, because they are soluble in ordinary organic solvents and thermoplastic, they can be converted to molded articles of various configurations. In order to fire these molded articles in their as-molded configurations, they have to be made infusible by curing before submitting them to firing. The most suitable method for curing is to heat the molded articles in the air. For this purpose, it is necessary to heat them gradually to a point near the softening point of the polycarbosilane, or to heat them for a very long period of time at low temperatures. The conventional polycarbosilanes have the defect that the molded articles become molten during heat-curing or curing is not fully achieved and does not extend to the inside of the molded articles It has been extremely difficult to remove these defects.

The present inventors have made extensive investigations in order to remove the above defects These investigations have led to the discovery of a process for producing a novel organosilicon polymer composed mainly of a carbosilane skeleton and a polysilane skeleton, which does not require use of a special device such as a flowtype device adapted for recycling or a pressurized vessel or a special reaction promoter such as polyborosiloxane. The present inventors have also found that the organosilicon polymer obtained by the above process which consists mainly of a carbosilane skeleton and a polysilane skeleton can be more readily rendered insoluble than polycarbosilanes obtained by conventional processes, and have a high residual ratio on firing in a non-oxidizable atmosphere.

SUMMARY OF THE INVENTION

According to this invention, there is provided a process for producing an organosilicon polymer having a carbosilane skeleton and a polysilane skeleton, which comprises adding at least one anhydrous metal halide to a polysilane having the following structure

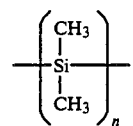

wherein n is at least 3, the amount of the metal halide being 0.5 to 10% by weight based on the weight of the polysilane, and heating the mixture in an atmosphere inert to the reaction.

The organosilicon polymer of the invention obtained by the above process of this invention is composed mainly of the following structural units (A), (B), (C), (D), (E) and (F)

(A)

(B)

(C)

(D)

(E)

(F)

wherein R represents $CH_3$ or H, said structural units forming linear, branched and cyclic structures and the main-chain skeleton of said polymer having a polysilane skeleton of the formula

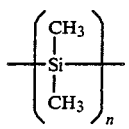

wherein n is a number of from 2 to 10.

The organosilicon polymer of this invention usually has an absorption in a far infrared region of 450 to 300 cm$^{-1}$, an absorption end appearing at 340 to 370 nm in its ultraviolet absorption spectrum, and a number average molecular weight of 400 to 5,000.

DETAILED DESCRIPTION OF THE INVENTION

Figure 1:
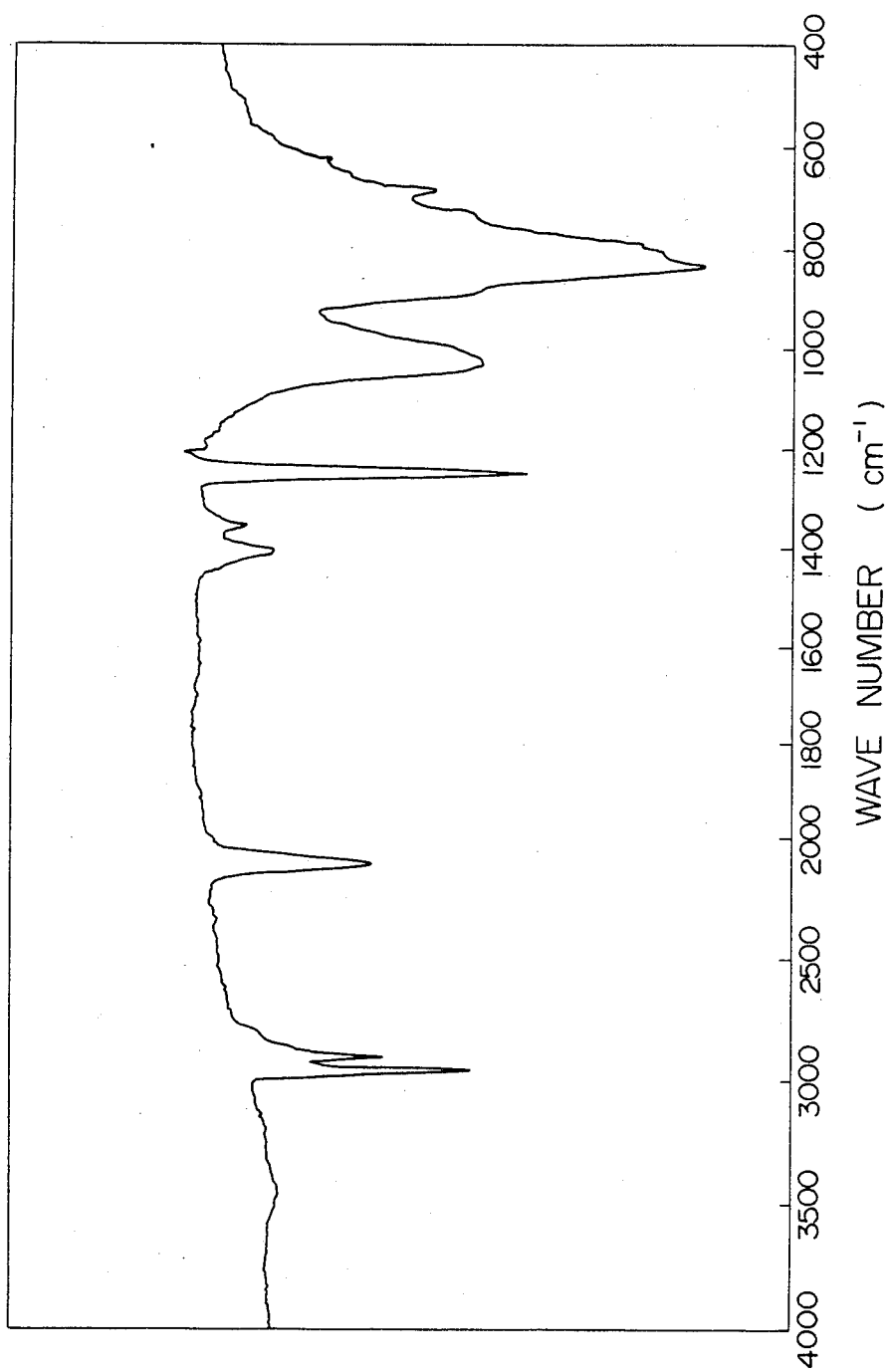
FIG. 1 is an IR absorption spectrum (KBr tablet method) of the organosilicon polymer synthesized by adding 1.50 g of AlCl$_3$ in Example 1 of the present invention.

The process of this invention will first be desrcibed.

One starting material used in the process of this invention is a polysilane having the following structure.

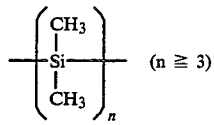

It may be linear or cyclic or of a linear-cyclic mixed structure. Linear polysilane (10≦n) is preferred, and the terminal group is preferably OH or CH$_3$. Polysilanes in which the methyl groups are partly replaced by ethyl, phenyl or hydrogen can also be used. However, the use of such polysilanes may decrease the yield of the product, and polysilanes partly having hydrogen are unstable and flammable.

The polysilanes used in this invention can be synthesized by various methods, for example, those described in a Japanese-language publication "Synthetic Reactions Using Organometallic Compounds (Part II)" written by Takeo Saegusa, Yoshihiko Ito and Makoto Kumada, or K. Kumada and K. Tamao, Advan. Organometal. Chem., 6, 19 (1968). Linear polysilane is synthesized by utilizing condensation reaction of a methylhalogenosilane with an alkali metal such as potassium, sodium, sodium-potassium alloy, or lithium.

The other starting material used in the process of this invention is the anhydrous metal halide which may be at least one halide of a metal of Group II (alkaline earth metals and zinc-group metals), III, IV excepting carbon, VIII (iron-group), Vb, VIb or VIIb of the periodic table, antimony, or bismuth. The halide may be the fluoride, chloride, bromide or iodide. The chloride and bromide are preferred, and the chloride is especially preferred. The use of the anhydrous metal halide is preferred. If a hydrous salt of the metal halide is used, the reaction may not proceed, or oxygen will be contained in the skeleton of the organosilicon polymer formed. Examples of the suitable metal halide that can be used include BeCl$_2$, SrCl$_2$, NdCl$_3$, ThCl$_4$, TiCl$_4$, ZrCl$_4$, HfCl$_4$, VCl$^3$, VCl$_4$, NbCl$_5$, TaCl$_5$, CrCl$_3$, MnCl$_2$, FeCl$_3$, CoCl$_2$, ZnCl$_2$, AlCl$_3$, GaCl$_3$, TlCl, SiCl$_4$, GeCl$_4$, SnCl$_4$, PbCl$_2$, SbCl$_5$, SbCl$_3$, BiCl$_3$, AlBr$_3$, and GaBr$_3$. Among these, AlCl$_3$, GaCl$_3$, MnCl$_2$, ZrCl$_4$, TiCl$_4$, VCl$_3$ and CrCl$_3$ are especially suitable because they increase the molecular weight of the product. The reaction in accordance with this invention may be carried out by using a mixture of at least one of these chlorides and another chloride, if desired in the presence of a very small amount of a hydrogen halide. In this case, the molecular weight distribution of the organosilicon polymer can be easily performed.

In the process of this invention, 0.5 to 10% by weight, based on the weight of the polysilane, of at least one anhydrous metal halide is added to the polysilane of the structure

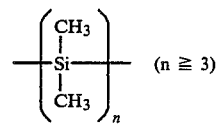

and the mixture is heated in an atmosphere inert to the reaction.

One important advantage of the process of this invention is that no special device such as a pressurized reactor or a flow-type device adapted for recycling is required for reacting the mixture, but the reactor used in the process of this invention may be a reactor, for example a can-like stainless steel reactor, equipped with an inlet and outlet for a gas inert to the reaction and a refluxing device capable of cooling and refluxing low-boiling components during the reaction when the reactor is heated by a heating furnace such as an electric furnace Another advantage is that no special reaction promoter such as polyborosiloxane is required, and anhydrous metal halides which are readily available can be used.

It is essential that in the process of this invention, the reaction should be carried out in a gaseous atmosphere which is inert to the reaction. If the reaction is carried out in an oxidizing atmosphere such as air, the starting polysilane is susceptible to oxidation. Examples of the inert gas are nitrogen, argon, helium, carbon monoxide, carbon dioxide, hydrogen, and hydrocarbons.

Preferably, the reaction is carried out generally under atmosheric pressure. If the reaction is carried out in vacuum or under reduced pressure, low-molecular-weight components distill out of the reaction system, and the yield of the final product decreases markedly. In performing the process of this invention, the reaction is preferably carried out while feeding a stream of an inert gas into the reaction zone because by so doing, the pressure inside the reactor is maintained atmospheric, and the temperature rise or a rise in pressure owing to gases such as hydrogen and methane formed during the reaction can be prevented.

The heating temperature used in the process of this invention is lower than in the prior art, and it is another advantage that the process of this invention can be carried out usually at 250° C. or higher, preferably at 280° to 400°C. If the reaction temperature is below 250° C., the reaction does not proceed sufficiently, and at 450° C. or higher, gellation of the resulting organosilicon polymer would undesirably occur.

The reaction time in the process of this invention is usually at least 3 hours. When the reaction is carried out for more than 20 hours, no substantial improvement in the resulting organosilicon polymer is generally achieved although this depends upon the type of the metal halide used.

In the process of this invention, the amount of the anhydrous metal halide is 0.5 to 10% by weight based on the weight of the polysilane. This is because if the amount is less than 0.5% by weight, the proportion of the polysilane skeleton in the resulting organosilicon polymer is very high as compared with the proportion of the carbosilane skeleton. As a result, the polymer may become insoluble in ordinary organic solvents, or have a very low residual ratio on firing in a non-oxidizing atmosphere. On the other hand, if the metal halide is added in an amount of more than 10% by weight, the product will be gelled. Moreover, the use of an anhydrous metal halide which does not cause gellation of the polymer even when it is added in an amount of more than 10% by weight is economically disadvantageous in the production of the organosilicon polymer of the invention. In such a case, the use of a mixture of at least two anhydrous metal halides is practical. The preferred amount of the anhydrous metal halide is 1.0 to 8.0% by weight.

The organosilicon polymer obtained by the above reaction can be purified by dissolving it in a solvent, filtering the solution, hot-filtering it as required, and then evaporating off the solvent. If desired, the average molecular weight of the polymer may be increased by removing low-molecular-weight components at 50° to 450° C. under atmospheric pressure or reduced pressure. Examples of such a solvent are n-hexane, cyclohexane, benzene, toluene, xylene, and tetrahydrofuran. Another method for increasing the average molecular weight of the polymer involves selective precipitation of high-molecular-weight components using a mixture of the above good solvent and a poor solvent such as acetone, methanol or ethanol.

The novel feature of the process of this invention is that an organosilicon polymer composed mainly of a carbosilane skeleton and a polysilane skeleton is produced from a mixture of a polysilane and a small amount of tne anhydrous metal halide. This feature is considered to bring about the advantage of not requiring any special reactor and any special reaction promoter and of employing relatively low heating temperatures. The mechanism of bringing about such an advantage by the addition of a small amount of the anhydrous metal halide to the polysilane is described below. This is, however, a mere theorization, and the invention is in no way limited thereby.

The polysilane as one starting material used in this invention gradually decomposes at a heating temperature of generally at least about 180° C. in a non-oxidizing atmosphere. At more than 280° C., most of the polysilane is converted to a mixture of monosilane

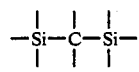

low-molecular-weight polysilane

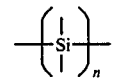

($2 \leq n \leq 0$) and low-molecular-weight polysilane partly converted to carbosilane, and the heat decomposition ends at about 400° C. These low-molecular-weight products tend to be released out of the reaction system. In order to carry out the polymerization reaction in good yields, scattering of the low-molecular-weight products is prevented according to the prior art by using a special device such as a pressurized closed vessel or a flow-type device for recycling the low-molecular-weight components to a portion heated at a high temperature so as to increase their molecular weight gradually, or a special reaction promoter, such as polyborosiloxane, capable of forming an intermediate product with these low-molecular-weight components by a siloxane linkage and capturing it.

In contrast, when a mixture of polysilane and anhydrous metal halide is used as a starting material according to the process of this invention, the low-molecular-weight products are converted to an organosilicon polymer composed of a carbosilane skeleton and a polysilane skeleton with good efficiency. The mechanism of conversion cannot simply be presumed from the fact that metal halides typified by anhydrous aluminum chloride are used as catalysts in Friedel-Crafts reactions in a broad sense, i.e. alkylation, ketone synthesis, carboxylic acid synthesis, aldehyde synthesis, halogenation, isomerization, polymerization, etc. But the following theoretical consideration may be made.

The polysilane used in this invention begins to decompose gradually at a temperature of more than about 180° C. to give low-molecular-weight components. This is due mainly to radical cleavage of the Si-Si bond, and the resulting radicals extract hydrogen atoms from the methyl groups of the polysilane.

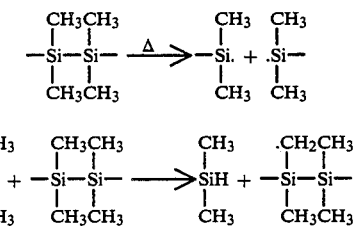

Sometimes, the methyl groups from which hydrogens have been extracted may form a carbosilane bond of the formula $$-\underset{|}{\overset{|}{Si}}-\underset{|}{\overset{|}{C}}-\underset{|}{\overset{|}{Si}}-$$

by a radical transfer reaction shown by the following formula

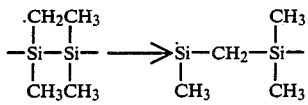

However, since many radicals form in the reaction system, re-combination of the radicals occur mainly to form stable monosilane, polysilane or low-molecular-weight products such as polysilane partly converted to carbosilane. If a metal halide is present during the heat decomposition, halogenation of the methyl groups of the polysilane takes place. Although no clear mechanism for this has been completely elucidated, it is due presumably to the presence of a trace of hydrogen halide as shown by the following scheme.

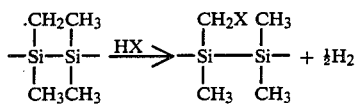

The polysilane having halogenated methyl groups readily form a carbosilane bond in the presence of a catalytic amount of the metal halide by intramolecular rearrangement as shown schematically below.

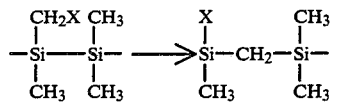

Halogen atoms which have moved to the silicon atoms are extracted by hydrogens present in the reaction system and regenerated to hydrogen halide, whereby halogenation of the methyl groups is repeated. In this way, the polysilane used in this invention is converted to a polymer containing many carbosilane skeletons which are not vulnerable to heat decomposition, before it is decomposed to a stable low-molecular-weight product. The catalytic action of the metal halide on the polysilane is also exerted on the intramolecular rearrangement of the linear polysilane to the branched polysilane, or on a reaction of reducing the ring of the cyclic polysilane. Since these reactions generally proceed in a direction of forming an isomer which has the greatest degree of branching and is most stable thermally, the organosilicon polymer synthesized by the process of this invention is composed of a carbosilane skeleton and a polysilane skeleton The organosilicon polymer obtained by the process of this invention is described below.

Figure 2:
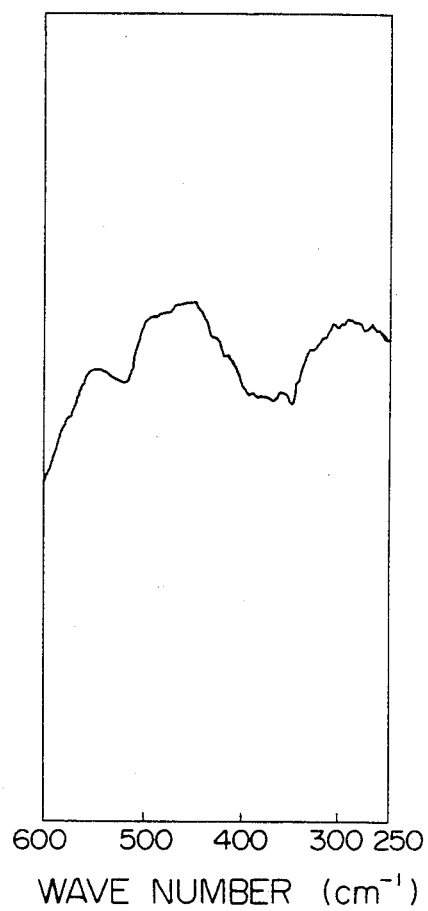
FIG. 2 is a far infrared absorption spectrum (KI tablet method) of the same organosilicon polymer as shown in FIG. 1.

The IR absorption spectrum of the organosilicon polymer of this invention shows absorptions ascribable to Si-CH$_3$ at about 830 cm$^{-1}$ and 1250 cm$^{-1}$, CH at 1410, 2900 and 2950 cm$^{-1}$, Si-H at 2100 cm$^{-1}$ Si-CH$_2$-Si at 1030 and 1355 cm$^{-1}$, as shown in FIG. 1. It also shows a broad absorption ranging from 300 to 450 cm$^{-1}$ as demonstrated by an infrared absorption spectrum in the region of 600 to 250 cm$^{-1}$ in FIG. 2. This absorption is based on an Si-Si bond, and has an absorption peak at 400 cm$^{-1}$ for (Me$_2$Si)$_5$, 383 cm$^{-1}$ for (Me$_2$Si)$_6$, and 362 cm$^{-1}$ for (Me$_2$Si)$_7$, and therefore it is inherent fo cyclic polysilane. Of course, the linear polysilane used in this invention does not show an absorption in the far infrared region. It has been found therefore that the organosilicon polymer obtained in the present invention contains in the skeleton a polysilane portion such as a 5-membered, 6-membered or 7-membered ring.

Figure 3:
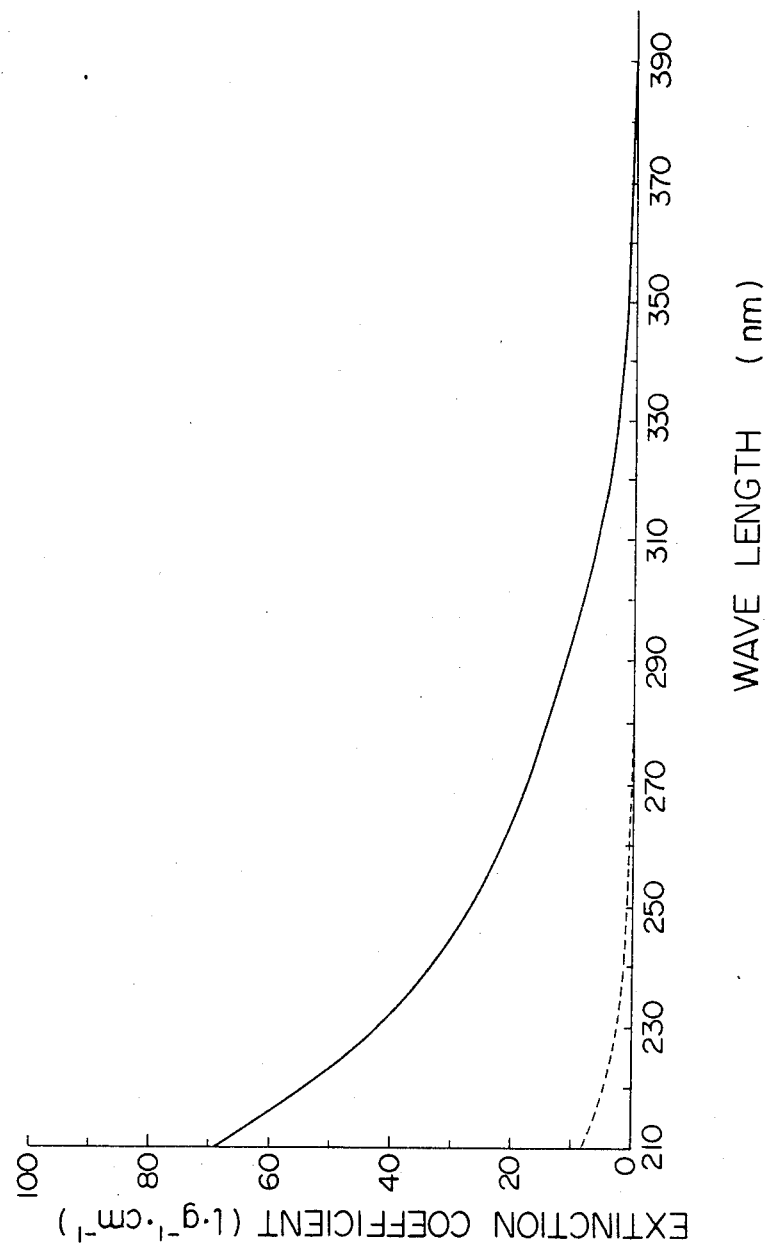
FIG. 3 is an ultraviolet absorption spectrum of the same organosilicon polymer as in FIG. 1.

FIG. 3 shows an ultraviolet absorption spectrum of the polymer of this invention. In this spectrum, absoprtion ends occur at 340 to 370 nm, and a large absorption exists in the ultraviolet region.

For comparision, the polysilane used in this invention is reacted in an autoclave at 470° C. for 14 hours at a final pressure of 110 kg/cm$^2$ to produce polycarbosilane having a number average molecular weight of 1800. The absorption spectrum of this polycarbosilane is shown by a broken line.

TABLE 1

| Compound | UV absorption maximum | |
|---|---|---|
| | λmax (nm) | νmax (cm$^{-1}$) |
| Me$_3$SiSiMe$_3$ | 193.5 | 51700 |
| Me(Me$_2$Si)$_3$Me | 216.3 | 46200 |
| Me(Me$_2$Si)$_4$Me | 235.0 | 42550 |
| Me(Me$_2$Si)$_5$Me | 250.0 | 40000 |
| Me(Me$_2$Si)$_6$Me | 220.0 (sh.) | 38500 |
| | 260.0 | |
| Me(Me$_2$Si)$_8$Me | 215.0 (sh.) | 36700 |
| | 240.5 | |
| | 272.5 | |
| (Me$_2$Si)$_5$ | 261 | 38300 |
| | 272 | 36700 |
| (Me$_2$Si)$_6$ | 232 | 43100 |
| | 255 | 39200 |
| (Me$_2$Si)$_7$ | 217 | 46100 |
| | 242 | 41300 | sh. = shoulder

In many cases, the polysilane shows an absorption in the ultraviolet portion, as shown in Table 1. The absorption spectrum in FIG. 3 shows that the skeleton of the resulting organosilicon polymer contains a linear and/or a cyclic polysilane portion of —Si—$_n$ (2≦n≦10)

The polymer of this invention is also measured by $^1$H NMR spectrum and $^{13}$C NMR spectrum using tetramethylsilane as a standard substance. The $^1$H NMR spectrum shows an absorption peak at 4–5.5 ppm ascribable to Si-H and a broad absorption peak ascribable to a mixture of SiMe$_5$, SiMe, Si—CH$_2$—and

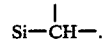

The $^{13}$C NMR spectrum only shows a broad absorption peak at —7 to 20 ppm, and this supports that SiMe$_2$, Si—CH$_2$—,

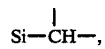

etc. are mixed.

The relative proportions of elements by chemical analysis are usually 40–55% of Si, 30–40% of C, 0.1–3.5% of O and 6.5–8.5% of H, all based on the weight of the polymer. The proportion of a metallic element in the polymer which is ascribable to the metal halide is not more than 0.1% by weight, usually not more than 0.05% by weight.

From the results of the aforesaid IR spectrum, UV spectrum, NMR spectrum and chemical analysis, the following conclusion can be drawn about the structure of the organosilicon polymer of the invention.

From the results of the IR spectrum, the elements constituting the organosilicon polymer are as follows:

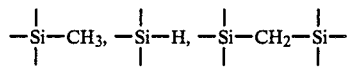

The far infrared absorption spectrum shows the polymer to have cyclic polysilane portions such as

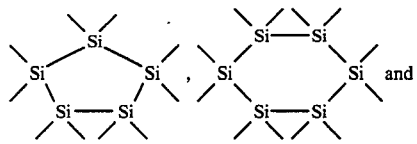

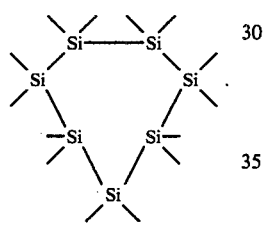

The ultraviolet absorption spectrum shows the polymer to have a linear polysilane portion of the formula

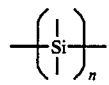

(2≦n≦10) in addition to the cyclic polysilane portions.

The ¹H NMR spectrum and ¹³C NMR spectrum showed that the polymer has the following bonds.

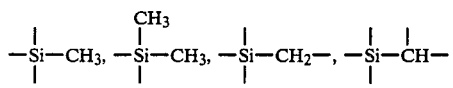

There can also be present constituent elements formed of the carbosilane skeleton and the polysilane skeleton, such as

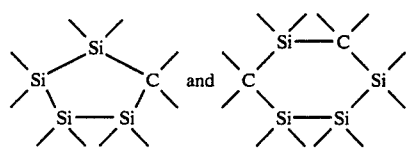

Accordingly, the organosilicon polymer of the invention consists substantially of the following structural units (A), (B), (C), (D), (E) and (F).

 (A)

 (B)

 (C)

 (D)

 (E)

(F)

(R = CH₃ or H)

These structural units form linear, branched and cyclic structures, and the main chain of the polymer also has the polysilane skeleton

(2≦n≦10). For example, the following molecular structure is presumably assigned to the plymer of this invention.

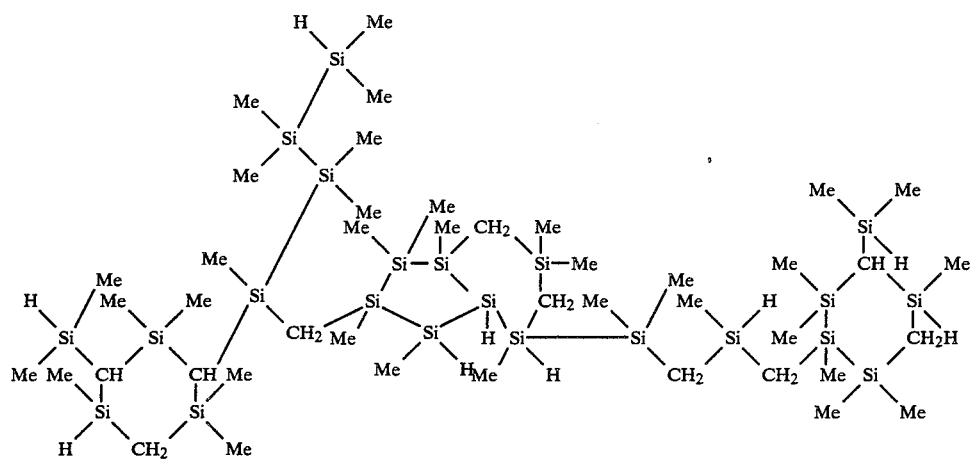

The organosilicon polymer of the invention has a number average molecular weight, measured by the vapor pressure osmosis method, of 400 to 5,000.

Because of having a polysilane skeleton, the organosilicon polymer of the invention is easier to subject to a treatment of rendering it infusible than polycarbosilanes produced by conventional methods. The polysilane skeleton, when heated at a low temperature, easily reacts with oxygen to form a siloxane linkage. It also easily forms radicals under the action of ultraviolet rays. As a result, it forms an intermolecular crosslinkage and becomes infusible.

This is clearly seen from the data given in Table 2 below which were obtained by comparing (1) an organosilicon polymer in accordance with this invention obtained by adding 1.5 g of anhydrous aluminum chloride to 100 g of polysilane and heating the mixture at 355° C. for 16.5 hours, (2) polycarbosilane obtained by a conventional method by reacting polysilane in an autoclave at 470° C. for 14 hours under a final pressure of 110 kg/cm², and (3) polycarbosilane containing a siloxane bond obtained by a conventional method by adding 3.2% by weight of polyborodiphenylsiloxane to polysilane, and reacting them at 350° C. for 6 hours.

cofigurations. Advantageously, the organosilicon polymer is rendered infusible, and heated at a temperature of at least 800° C. in a nonoxidizing atmosphere thereby to convert it into a molded article composed mainly of SiC while retaining its configuration. Examples of such a molded article are continuous fibers, films and coatings of silicon carbide.

The following Examples illustrate the present invention.

EXAMPLE 1

A 5-liter three-necked flask was charged with 2.5 liters of anhydrous xylene and 400 g of sodium, and in a stream of nitrogen gas, they were heated to the boiling point of xylene. With stirring, 1 liter of dimethyldichlorosilane was added dropwise over 45 minutes. After the addition, the mixture was heated under reflux for 10 hours to form a precipitate. The precipitate was filtered, washed with methanol and then with water, dried, and further washed with acetone and benzene to afford 380 g of polysilane of the formula

TABLE 2

| Item | Polycarbosilane by the conventional method under pressure | Polycarbosilane containing a siloxane bond by the conventional method | Organosilicon polymer of the invention |
|---|---|---|---|
| Number average molecular weight | 1750 | 1860 | 1600 |
| Oxidation starting temperature (°C.) when heated at 5° C./min. in the air | 180 | 110 | 80 |
| Cyclohexane-insoluble portion (%) 20 hours after irradiaiton of ultraviolet light at 254 nm | below 1 | 15 | 65 |
| Residual ratio (%) on firing by maintaining the polymer, subjected to the above ultraviolet irradiation, in an argon gas at 1300° C. for 1 hour | 55.3 | 62.2 | 79.8 |

As shown in Table 2, the organosilicon polymer of the invention has the advantage that it has a high residual ratio on firing, and is easy to form into molded articles of various configurations. The organosilicon polymer of the invention is available in various forms ranging from a liquid viscous at room temperature to a thermoplastic solid which melts at 300° C., and is soluble in various solvents such as n-hexane, cyclohexane, benzene, toluene, xylene and tetrahydrofuran. Accordingly, it can be formed into molded articles of various

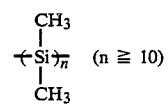

as a white powder

AlCl₃ was added in an amount of 1.00, 1.25, 1.50 or 1.60 g to 100 g of the resulting polysilane. The mixture was heated for 8 hours or 16.5 hours in a stream of nitrogen in a 10-liter quartz tube equipped with a refluxing tube. After the reaction, the reaction mixture was dissolved in xylene and filtered to remove impurities. The filtrate was distilled in an atmosphere of nitrogen by heating to a temperature of 320° C. to remove xylene and low-boiling components to form an organosilicon polymer in accordance with this invention. The results are shown in Table 3. The reaction temperatures, given hereinbelow, all denote the final reaction temperatures.

TABLE 3

| Amount of AlCl₃ added (g) | Reaction temperature (°C.) | Reaction time (hours) | Yield (g) | Number average molecular weight |
|---|---|---|---|---|
| 1.00 | 330 | 8.0 | 58.0 | 650 |
| 1.00 | 335 | 16.5 | 62.0 | 1000 |
| 1.25 | 340 | 16.5 | 66.0 | 1270 |
| 1.50 | 355 | 16.5 | 59.5 | 1600 |
| 1.60 | 370 | 8.0 | 50.5 | 4100 |

EXAMPLE 2

Anhydrous zirconium chloride, $ZrCl_4$, was added in an amount of 1.96, 2.50, 3.00, or 5.00 g to 100 g of the polysilane synthesized in Example 1, and the mixture was reacted for 16.5 hours in the same way as in Example 1 to give an organosilicon polymer of the invention. The results are shown in Table 4.

TABLE 4

| Amount of ZrCl₄ added (g) | Reaction temperature (°C.) | Yield (g) | Number average molecular weight |
|---|---|---|---|
| 1.96 | 340 | 67.0 | 570 |
| 2.50 | 350 | 56.5 | 1100 |
| 3.00 | 355 | 56.0 | 1260 |
| 5.00 | 370 | 55.5 | 3900 |

EXAMPLE 3

$MnCl_2$, $CrCl_3$, $VCl_3$, $TiCl_4$ or $GaCl_3$ was added to 100 g of the polysilane synthesized in Example 1, and the mixture was reacted for 16.5 hours in the same way as in Example 1 to give an organosilicon polymer of the invention. The results are shown in Table 5.

TABLE 5

| Metal halide | Amount (g) | Reaction temperature (°C.) | Yield (g) | Number average molecular weight |
|---|---|---|---|---|
| MnCl₂ | 5.00 | 365 | 58.0 | 1800 |
| CrCl₃ | 5.00 | 350 | 62.0 | 1150 |
| VCl₃ | 5.00 | 370 | 55.4 | 2850 |
| TiCl₄ | 2.50 | 340 | 68.3 | 960 |
| TiCl₄ | 3.00 | 355 | 70.0 | 1100 |
| TiCl₄ | 5.00 | 368 | 58.0 | 1710 |
| GaCl₃ | 3.00 | 360 | 58.5 | 2050 |

EXAMPLE 4

$CoCl_2$, $PbCl_2$, $BiCl_2$, $ZnCl_2$, $SiCl_4$, $TlCl$, $TaCl_5$, $FeCl_3$, $SnCl_4$, or $SrCl_2$ was added to 100 g of the polysilane synthesized in Example 1, and the mixture was reacted for 16.5 hours in the same way as in Example 1 to give an organosilicon polymer in accordance with this invention. The results are shown in Table 6.

TABLE 6

| Metal halide | Amount (g) | Reaction temperature (°C.) | Yield (g) | Number average molecular weight |
|---|---|---|---|---|
| CoCl₂ | 3.00 | 290 | 75.0 | 450 |
| PbCl₂ | 3.50 | 310 | 72.0 | 600 |
| BiCl₃ | 6.00 | 300 | 74.0 | 580 |
| ZnCl₂ | 5.00 | 330 | 48.0 | 500 |
| SiCl₄ | 3.00 | 345 | 67.0 | 740 |
| TlCl | 5.00 | 308 | 74.0 | 660 |
| TaCl₅ | 5.00 | 350 | 60.0 | 820 |
| FeCl₃ | 5.00 | 320 | 70.0 | 670 |
| SnCl₄ | 5.00 | 320 | 73.5 | 580 |
| SrCl₂ | 5.00 | 300 | 73.0 | 550 |

EXAMPLE 5

3.00 g of $CoCl_2$, $PbCl_2$ or $SiCl_4$ and 1.00 g of $AlCl_3$ were added to 100 g of the polysilane synthesized in Example 1, and the mixture was reacted for 8 hours in the same way as in Example 1 to give an organosilicon polymer of the invention. The results are shown in table 7.

TABLE 7

| Metal halide | Reaction temperature (°C.) | Yield (g) | Number average molecular weight |
|---|---|---|---|
| CoCl₂ + AlCl₃ | 340 | 74.0 | 950 |
| PbCl₂ + AlCl₃ | 345 | 69.8 | 1110 |
| SiCl₄ + AlCl₃ | 360 | 65.0 | 1270 |

A comparison of the results obtained in this Example with those in Example 1 shows that when the number average molecular weight of the organosilicon polymer is to be changed progressively, the use of such mixed halides is advantageous.

What we claim is:

1. An organosilicon polymer which comprises a main chain skeleton consisting of the following structural units (A), (B), (C), (D), (E) and (F):

(A)

(B)

(C)

(D)

(E)

(F)

wherein R represents CH₃ or H and wherein each such structural unit is bound through its free valencies with a group or formulae A through F, said structural units forming linear, branched and cyclic structures, said main chain skeleton further having a linear polysilane skeleton of the formula:

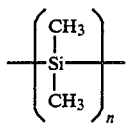

in which $2 \leq n \leq 10$ and a cyclic polysilane skeleton of the formula:

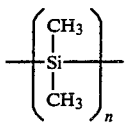

wherein n is 5, 6 or 7, the infrared absorbtion spectrum of said organosilicon polymer having an absorbtion range of 450 to 300 cm$^{-1}$ in the far infrared region.

2. The organosilicon polymer of claim 1 having an untraviolet spectrum with an absorption end at 340 to 370 nm and a number average molecular weight of 400 to 5,000.

3. A process for preparing an organosilicon Polymer having a main chain skeleton which consists of the following structural units (A), (B), (C), (D), (E) and (F):

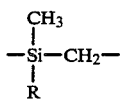 (A)

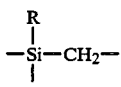 (B)

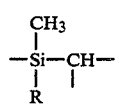 (C)

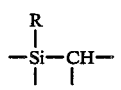 (D)

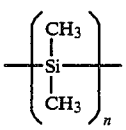 (E)

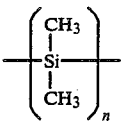 (F)

wherein R represents CH₃ or H and wherein each such structural units is bound through its free valencies with a group selected from formula A through F above, said structural units forming linear, branched and cyclic structures, said main chain skeleton further having a linear polysilane skeleton of the formula:

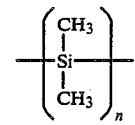

in which $2 < n < 10$ and a cyclic polysilane skeleton of the formula:

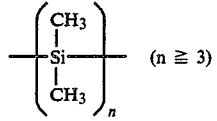

wherein n is 5, 6 or 7, which comprises adding at least one anhydrous metal halide to a polysilane having the structure

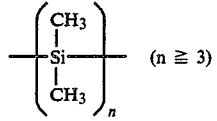 $(n \geq 3)$ the amount of the metal halide being 0.5 to 10% by weight based on the weight of the polysilane, and heating the mixture in an atmosphere inert to the reaction at 250 to 450° C.

4. The process of claim 3 wherein the metal halide is at least one compound selected from the group consisting of halides of metals of Groups II (alkaline earth metals and zinc-group metals), III, IV (excepting carbon), VIII (iron-group metals), Vb VIb and VIIb, and antimony halides and bismuth halides.

5. The process of claim 3 wherein the metal halide is selected from the group consisting of BeCl₂, SrCl₂, NdCl₃, ThCl₄, TiCl₄, ZrCl₄, HfCl₄, VCl₃, VCl₄, NbCl₅, TaCl₅, CrCl₃, MnCl₂, FeCl₃, CoCl₂, ZnCl₂, AlCl₃, GaCl₃, TlCl, SiCl₄, GeCl₄, SnCl₄, PbCl₂, SbCl₅, SbCl₃, BiCl₃, AlBr₃ and GaBr₃.

* * * * *